United States Patent
Onggosanusi et al.

(10) Patent No.: US 11,881,905 B2
(45) Date of Patent: Jan. 23, 2024

(54) METHOD AND APPARATUS FOR INTERFERENCE MEASUREMENT

(71) Applicant: Samsung Electronics Co., Ltd., Suwon-si (KR)

(72) Inventors: Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 16/730,685

(22) Filed: Dec. 30, 2019

(65) Prior Publication Data

US 2020/0220631 A1 Jul. 9, 2020

Related U.S. Application Data

(60) Provisional application No. 62/787,790, filed on Jan. 3, 2019.

(51) Int. Cl.
*H04B 17/336* (2015.01)
*H04W 24/08* (2009.01)
*H04W 24/10* (2009.01)

(52) U.S. Cl.
CPC .......... *H04B 17/336* (2015.01); *H04W 24/08* (2013.01); *H04W 24/10* (2013.01)

(58) Field of Classification Search
CPC ..... H04B 17/366; H04W 24/08; H04W 24/10
See application file for complete search history.

(56) References Cited

U.S. PATENT DOCUMENTS 10,945,149 B1 * 3/2021 Ryu ...................... H04L 5/0082
2012/0327874 A1 * 12/2012 Eriksson ............... H04L 1/0035
370/329

(Continued)

FOREIGN PATENT DOCUMENTS

| CN | 108418667 A | 8/2018 |
| EP | 3883137 A1 | 9/2021 |
| WO | 2018128940 A2 | 7/2018 |

OTHER PUBLICATIONS

Extended European Search Report dated Apr. 5, 2022 regarding Application No. 20736206.2, 10 pages.

(Continued)

*Primary Examiner* — Zhiren Qin

(57) ABSTRACT

Methods and apparatuses for channel and interference measurement. A method for operating user equipment (UE) includes receiving, from a base station, configuration information for a channel measurement resource (CMR) and N interference measurement resources (IMRs) and configuration information for a channel state information (CSI) reporting. The CSI reporting configuration information indicates a selection of a signal-to-interference-plus-noise ratio (SINR). The method further includes receiving reference signals associated with the CMR and the N IMRs, measuring the reference signals for calculating the CSI reporting, and transmitting the CSI reporting. The CSI reporting includes M SINRs each associated with an interference hypothesis. N is an integer greater than or equal to 2. M is an integer greater than or equal to 1. The CMR is a synchronization signal block (SSB) or a non-zero power channel state information reference signal (NZP CSI-RS). The N IMRs are NZP CSI-RSs.

13 Claims, 8 Drawing Sheets

(56) References Cited

U.S. PATENT DOCUMENTS

| | | | |
|---|---|---|---|
| 2013/0301450 A1 | 11/2013 | Geirhofer et al. | |
| 2014/0073336 A1* | 3/2014 | Kang | H04L 5/0035 455/452.1 |
| 2014/0112248 A1* | 4/2014 | Bergman | H04W 28/18 370/328 |
| 2015/0131563 A1 | 5/2015 | Guo et al. | |
| 2018/0241521 A1* | 8/2018 | Bontu | H04L 5/0057 |
| 2019/0165847 A1* | 5/2019 | Kim | H04L 1/0026 |
| 2019/0349103 A1* | 11/2019 | Wang | H04L 5/0035 |
| 2020/0007299 A1* | 1/2020 | Han | H04W 72/042 |
| 2020/0067614 A1* | 2/2020 | Wang | H04J 11/0056 |
| 2020/0106488 A1* | 4/2020 | Akoum | H04W 52/365 |
| 2020/0395989 A1* | 12/2020 | Faxér | H04L 5/0048 |
| 2021/0099271 A1* | 4/2021 | Zhang | H04L 5/0057 |
| 2021/0211176 A1* | 7/2021 | Gao | H04B 7/0632 |
| 2021/0258966 A1* | 8/2021 | Yoshioka | H04W 72/0413 |
| 2022/0014957 A1* | 1/2022 | Guo | H04W 72/21 |

OTHER PUBLICATIONS

Intel Corporation, "Summary 2 on SCell BFR and Beam Measurement", 3GPP TSG RAN WG1 Meeting #95, R1-1814145, Nov. 2018, 18 pages.
Huawei et al., "CSI acquisition details for NCJT", 3GPP TSG RAN WGI Meeting #90, RI-1713760, Aug. 2017, 8 pages.
"3rd Generation Partnership Project; Technical Specification Group Radio Access Network; Evolved Universal Terrestrial Radio Access (E-UTRA); Physical channels and modulation (Release 14)", 3GPP TS 36.211 V14.0.0, Sep. 2016, 170 pages.
"3rd Generation Partnership Project; Technical Specification Group Radio Access Network; Evolved Universal Terrestrial Radio Access (E-UTRA); Multiplexing and channel coding (Release 14)", 3GPP TS 36.212 V14.0.0, Sep. 2016, 148 pages.
"3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 406 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.0.0, Sep. 2016, 96 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.
"3rd Generation Partnership Project; Technical Specification Group Radio Access Network; NR; Physical channels and modulation (Release 15)", 3GPP TS 38.211 V15.0.0, Dec. 2017, 73 pages.
"3rd Generation Partnership Project; Technical Specification Group Radio Access Network; NR; Multiplexing and channel coding (Release 15)", 3GPP TS 38.212 V15.0.0, Dec. 2017, 82 pages.
"3rd Generation Partnership Project; Technical Specification Group Radio Access Network; NR; Physical layer procedures (Release 15)", 3GPP TS 38.213 V15.0.0, Dec. 2017, 56 pages.
"3rd Generation Partnership Project; Technical Specification Group Radio Access Network; NR; Physical layer procedures for data (Release 15)", 3GPP TS 38.214 V15.0.0, Dec. 2017, 71 pages.
"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.
"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.
"3rd Generation Partnership Project; Technical Specification Group Radio Access Network; NR; Physical layer measurements (Release 15)", 3GPP TS 38.215 V15.0.0, Dec. 2017, 13 pages.
European Patent Office, Communication pursuant to Article 94(3) EPC dated Apr. 14, 2023 regarding Application No. 20736206.2, 7 pages.
International Search Report and Written Opinion regarding International Application No. PCT/KR2020/000150, dated Apr. 27, 2020, 8 pages.
Ericsson, "Corrections and clarifications for CSI reporting", 3GPP TSG-RAN WG1 Meeting #93, R1-1806216, May 2018, 19 pages.
MediaTek Inc., "Remaining issues in CSI measurement", 3GPP TSG RAN WG1 Meeting #92, R1-1801653, Feb. 2018, 3 pages.

* cited by examiner

METHOD AND APPARATUS FOR INTERFERENCE MEASUREMENT

CROSS-REFERENCE TO RELATED APPLICATIONS AND CLAIM OF PRIORITY

This application claims priority to U.S. Provisional Patent Application No. 62/787,790, filed Jan. 3, 2019. The above-identified provisional patent application is hereby incorporated by reference in its entirety.

TECHNICAL FIELD

The present disclosure relates generally to methods for wireless communication systems and, more specifically, channel and interference measurement.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for channel and interference measurement.

In one embodiment, a user equipment (UE) is provided. The UE includes a transceiver and a processor operably connected to the transceiver. The transceiver is configured to receive, from a base station (BS), configuration information for a channel measurement resource (CMR) and N interference measurement resources (IMRs); configuration information for a channel state information (CSI) reporting; and receive reference signals associated with the CMR and the N IMRs. The CSI reporting configuration information indicates a selection of a signal-to-interference-plus-noise ratio (SINR). The processor is configured to measure the reference signals for calculating the CSI reporting. The transceiver is further configured to transmit the CSI reporting. The CSI reporting includes M SINRs each associated with an interference hypothesis. N is an integer greater than or equal to 2. M is an integer greater than or equal to 1. The CMR is a synchronization signal block (SSB) or a non-zero power channel state information reference signal (NZP CSI-RS). The N IMRs are NZP CSI-RSs.

In another embodiment, a BS is provided. The BS includes a processor and a transceiver operably connected to the processor. The processor is configured to generate configuration information for a CMR, N IMRs, and a CSI reporting. The configuration information for the CSI reporting indicates a selection of a SINR. The transceiver is configured to transmit, to a UE, the configuration information for the CMR, the N IMRs, and the CSI reporting; and receive, from the UE, the CSI reporting that is calculated based on the CMR and the IMRs. The CSI reporting includes M SINRs each associated with an interference hypothesis. N is an integer greater than or equal to 2. M is an integer greater than or equal to 1. The CMR is a SSB or a NZP CSI-RS. The N IMRs are NZP CSI-RSs.

In yet another embodiment, a method for operating a UE is provided. The method includes receiving from a base station, configuration information for a CMR and N IMRs and configuration information for a CSI reporting. The CSI reporting configuration information indicates a selection of a SINR. The method further includes receiving reference signals associated with the CMR and the N IMRs, measuring the reference signals for calculating the CSI reporting, and transmitting the CSI reporting. The CSI reporting includes M SINRs each associated with an interference hypothesis. N is an integer greater than or equal to 2. M is an integer greater than or equal to 1. The CMR is a SSB or a NZP CSI-RS. The N IMRs are NZP CSI-RSs.

The present disclosure relates to a pre-5th-Generation (5G) or 5G communication system to be provided for supporting higher data rates Beyond 4th-Generation (4G) communication system such as Long-Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
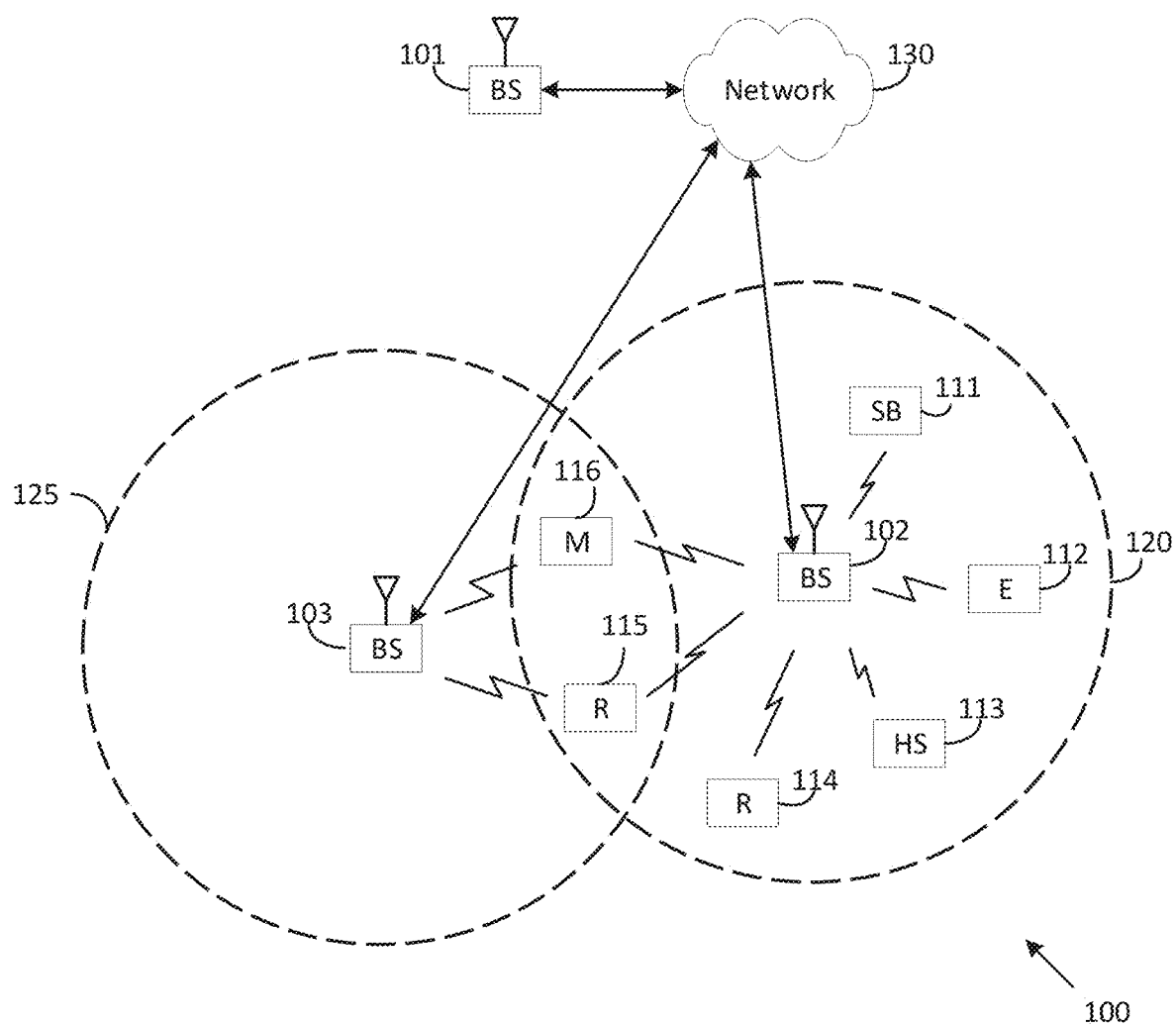
FIG. 1 illustrates an example wireless network according to various embodiments of the present disclosure.

FIGS. 1 through 8, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); 3GPP TS 38.331 version 15.0.0, "NR, Radio Resource Control (RRC) Protocol Specification" ("REF 11"); and 3GPP TS 38.215 version 15.0.0, "NR, Physical Layer Measurements" ("REF 12")".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands or, in general, above 6 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS," an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmits channel and interference measurement information to UEs 111-116 and configure UEs 111-116 for beam reporting as described in embodiments of the present disclosure. In various embodiments, one or more of UEs 111-116 receive channel and interference measurement information as described in embodiments of the present disclosure.

Although FIG. 1 illustrates one example of a wireless network 100, various changes can be made to FIG. 1. For example, the wireless network 100 can include any number of gNB s and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
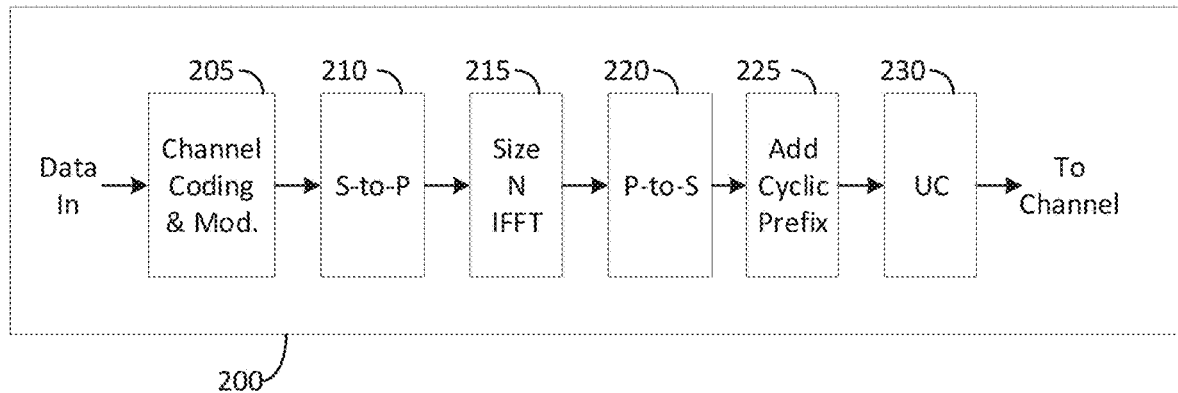
FIGS. 2A and 2B illustrate example wireless transmit and receive paths according to various embodiments of the present disclosure.
Figure 2B:
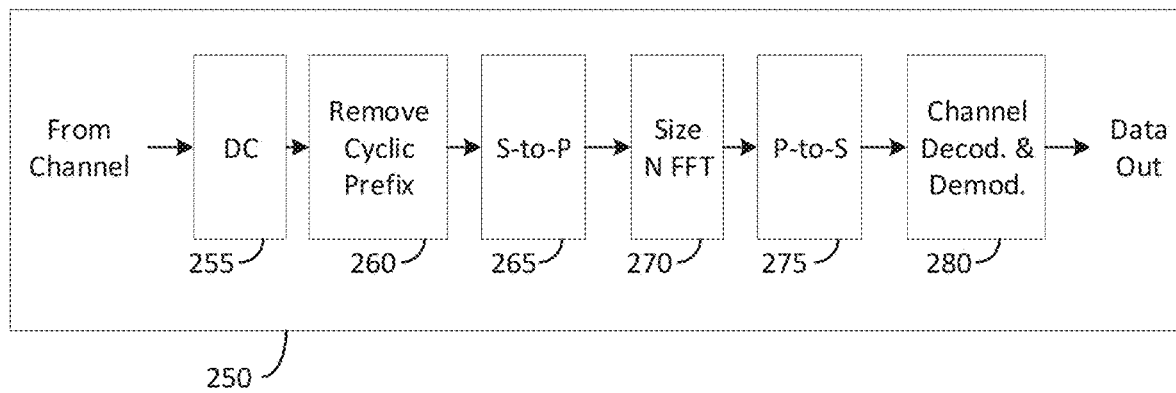

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive channel and interference measurement information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for beam reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
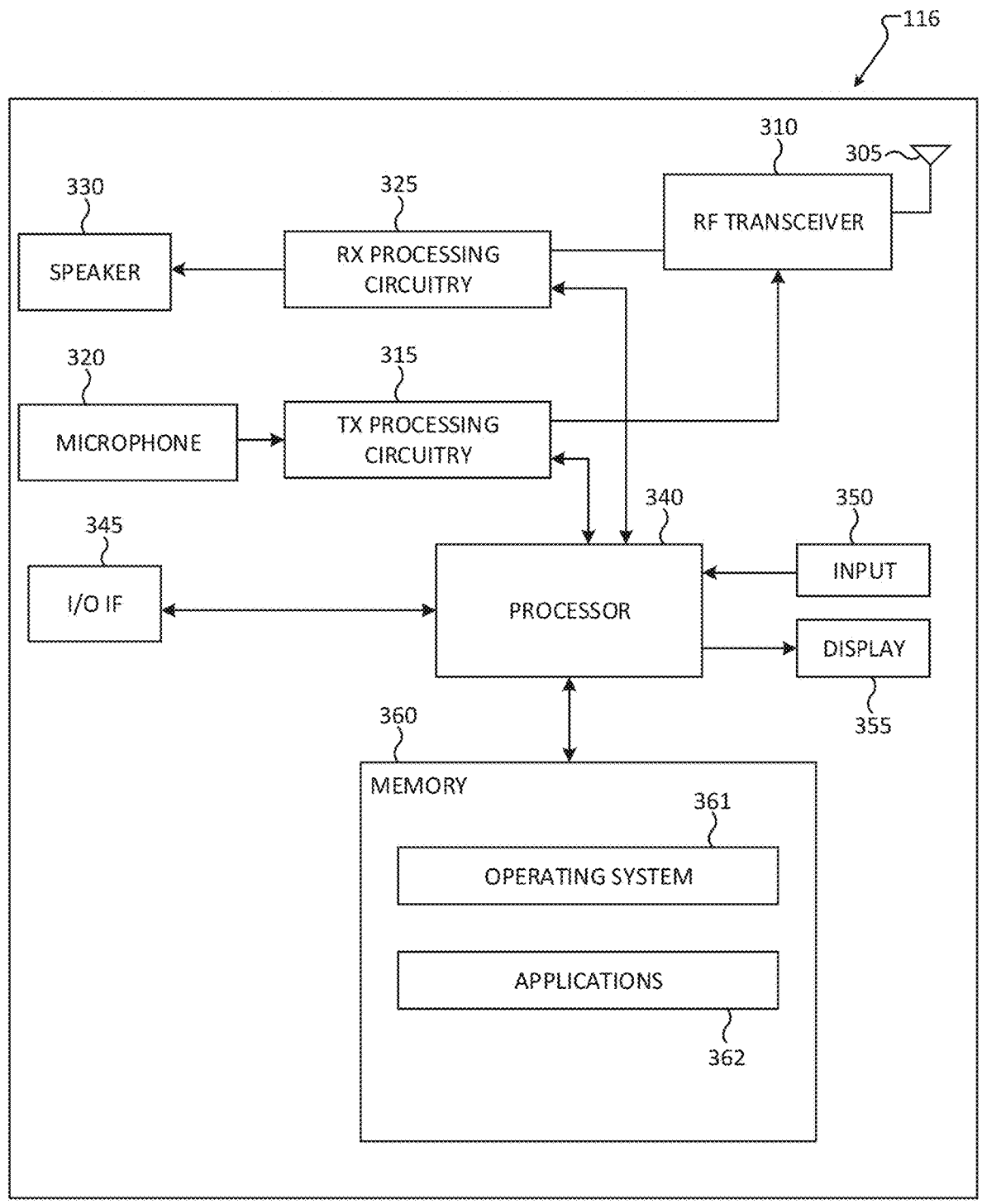
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for NZP or ZP CSI-RS reception and measurement for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
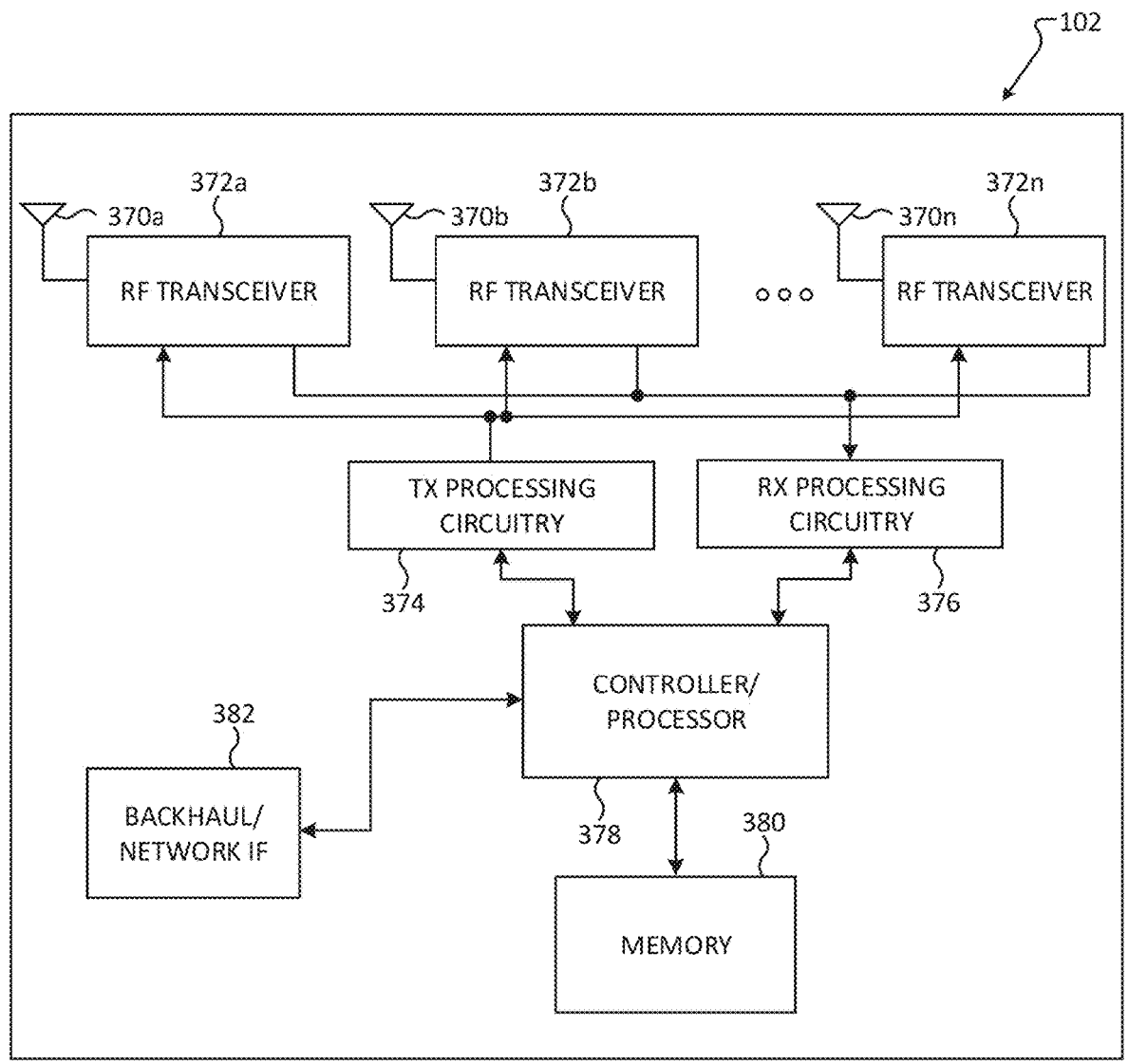
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmits UL beam indication information to a UE.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of 4. For example, this transmitter may be present in the gNB 102 or the UE 116 of FIG. 1. The embodiment of the transmitter 400 shown in FIG. 4 is for illustration only, and other transmitters can have the same or similar configuration.

Figure 4:
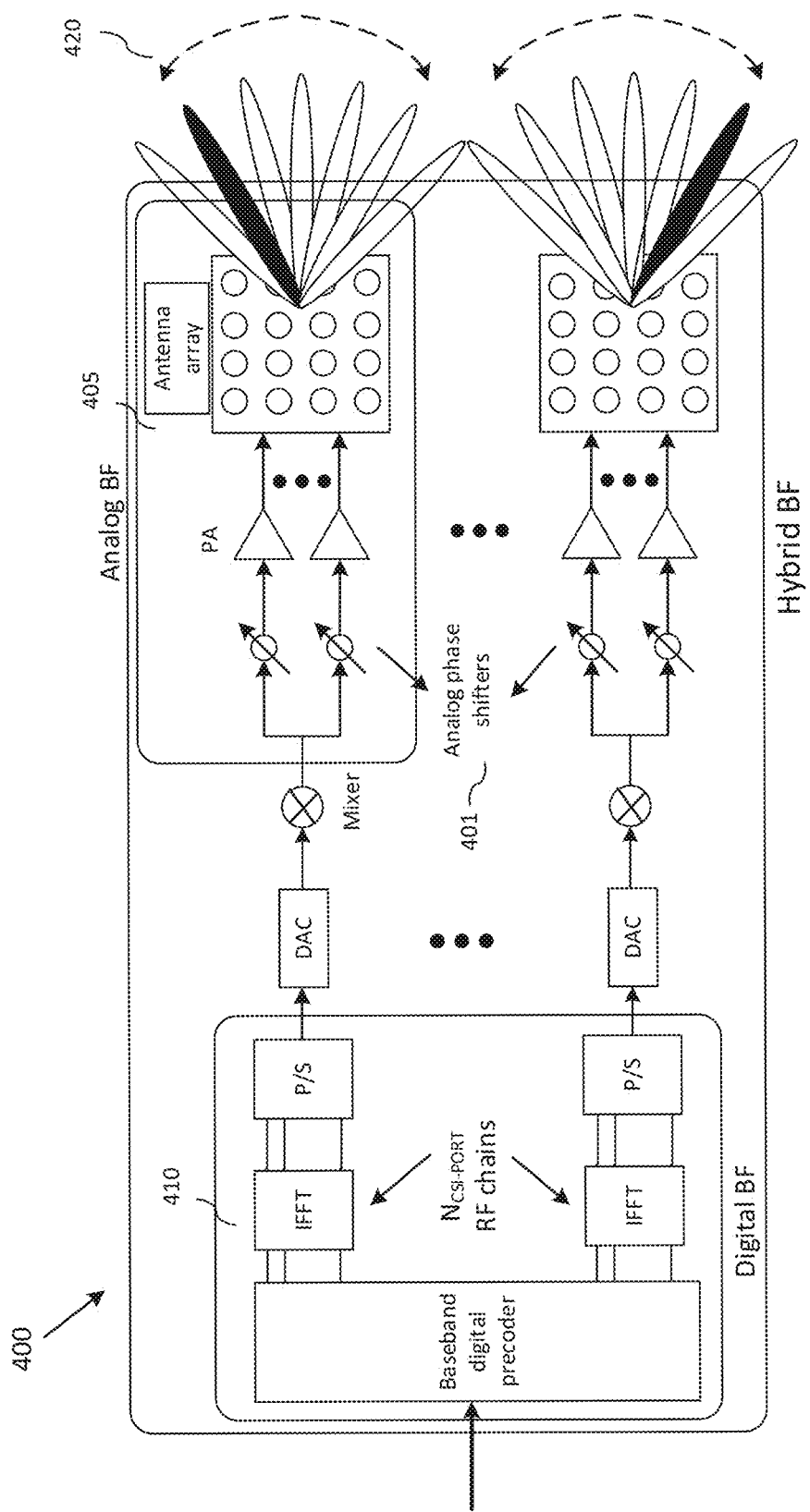
FIG. 4 illustrates an example beamforming architecture for a transmitter wherein one CSI-RS port is mapped onto a large number of analog-controlled antenna elements according to various embodiments of the present disclosure.

In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (e.g., only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (e.g., only one) reference RS. This linkage is configured via higher-layer signaling using the SpatialRelationInfo RRC parameter. Essentially, only one TX beam may be indicated to the UE.

For DL multi-beam operation, other than DL beam indication, DL beam measurement and reporting are essential UE procedures to facilitate DL beam selection. In Rel.15 NR, L1-RSRP, accompanied with an associated CSI-RS resource index (CRI) which serves as the beam index/indicator, is used as the metric for beam reporting. The L1-RSRP is calculated from measuring CSI-RS (hence CSI-RSRP), SSB (hence SS-RSRP), or both. Other metrics such as CSI/SS-RSRQ or CSI/SS-SINR have been proposed as well. In particular, SINR is expected to include some interference information (i.e. interference awareness). In TS 38.215, for instance, CSI-SINR is defined as follows:

| | |
|---|---|
| Definition | CSI signal-to-noise and interference ratio (CSI-SINR), is defined as the linear average over the power contribution (in [W]) of the resource elements carrying CSI reference signals divided by the linear average of the noise and interference power contribution (in [W]) over the resource elements carrying CSI reference signals reference signals within the same frequency bandwidth. For CSI-SINR determination CSI reference signals transmitted on antenna port 3000 according to 3GPP TS 38.211 [4] shall be used. For intra-frequency CSI-SINR measurements, if the measurement gap is not configured, UE is not expected to measure the CSI-RS resource(s) outside of the active downlink bandwidth part. For frequency range 1, the reference point for the CSI-SINR shall be the antenna connector of the UE. For frequency range 2, CSI-SINR shall be measured based on the combined signal from antenna elements corresponding to a given receiver branch. For frequency range 1 and 2, if receiver diversity is in use by the UE, the reported CSI-SINR value shall not be lower than the corresponding CSI-SINR of any of the individual receiver branches. |
| Applicable for | RRC_CONNECTED intra-frequency, RRC_CONNECTED inter-frequency |

The SS-SINR is defined similarly. Observe that although CSI/SS-SINR includes interference information, it is defined as the ratio between average signal power and average noise-plus-interference power measured based on the same CSI-RS or SSB. At least a few drawbacks can be identified. First, a metric defined as a ratio between average signal power and average noise-plus-interference power is not reflective of the real metric of interest, i.e. the average/mean of the ratio between signal power and noise-plus-interference power. Second, the manner in which receive diversity (the use of multiple receive chains) is incorporated is ad-hoc. While it accounts for selection receive diversity, it is unclear how maximum ratio combining can be accounted satisfactorily. Third, although signal and noise-plus-interference power can be measured from the same signal resource (either the same NZP CSI-RS or SSB), its accuracy degrades in the presence of strong and dominant interference.

Therefore, there is a need for a DL beam reporting metric that accounts for noise-plus-interference without the drawbacks mentioned above. There is also a need for interference measurement methods to facilitate the calculation of such beam reporting metrics. Lastly, there is also a need for the associated beam reporting mechanisms.

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the information to assign a particular UL TX beam to the UE.

The reference RS can be dynamically triggered by the NW/gNB (e.g. via DCI in case of aperiodic RS), preconfigured with a certain time-domain behavior (such as periodicity and offset, in case of periodic RS), or a combination of such pre-configuration and activation/deactivation (in case of semi-persistent RS).

Beam reporting can be configured as CSI reporting with reporting metric for beam management switched ON. Some examples of beam management metric are L1-RSRP and L1-SINR (with various possible embodiments).

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or >52.6 GHz (FR4), where multi-beam operation is especially relevant, transmission-reception process includes the receiver to select a receive (RX) beam for a given TX beam. For DL multi-beam operation, the UE selects a DL RX beam for every DL TX beam (which corresponds to a reference RS, represented by a TCI state). Therefore, the NW/gNB triggers or configures the UE to receive a DL RS (which is associated with a selection of DL TX beam). The UE, upon receiving and measuring the DL RS, calculates a beam report and transmits it to the gNB/NW, which in turn selects a DL TX beam. As a result, a TX-RX beam pair is derived. The NW/gNB can perform this operation for all the configured reference RSs or TCI states (either per reference RS or "beam sweeping") and determine all the TX-RX beam pairs associated with all the reference RSs (TCI states) configured to the UE.

Figure 5:
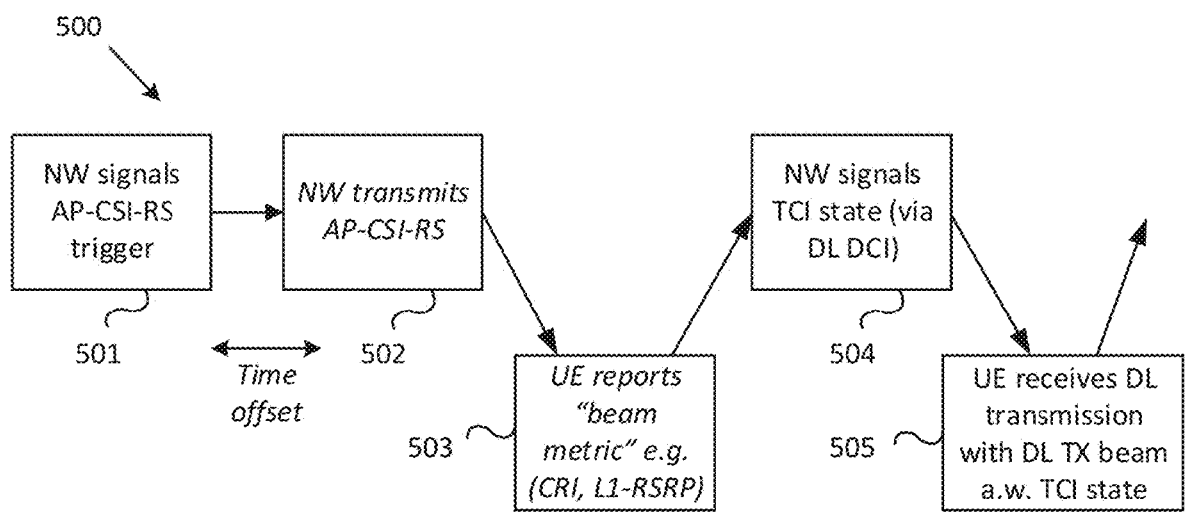
FIG. 5 illustrates a flow diagram for DL beam indication procedure according to one or more embodiments of the present disclosure.
Figure 6:
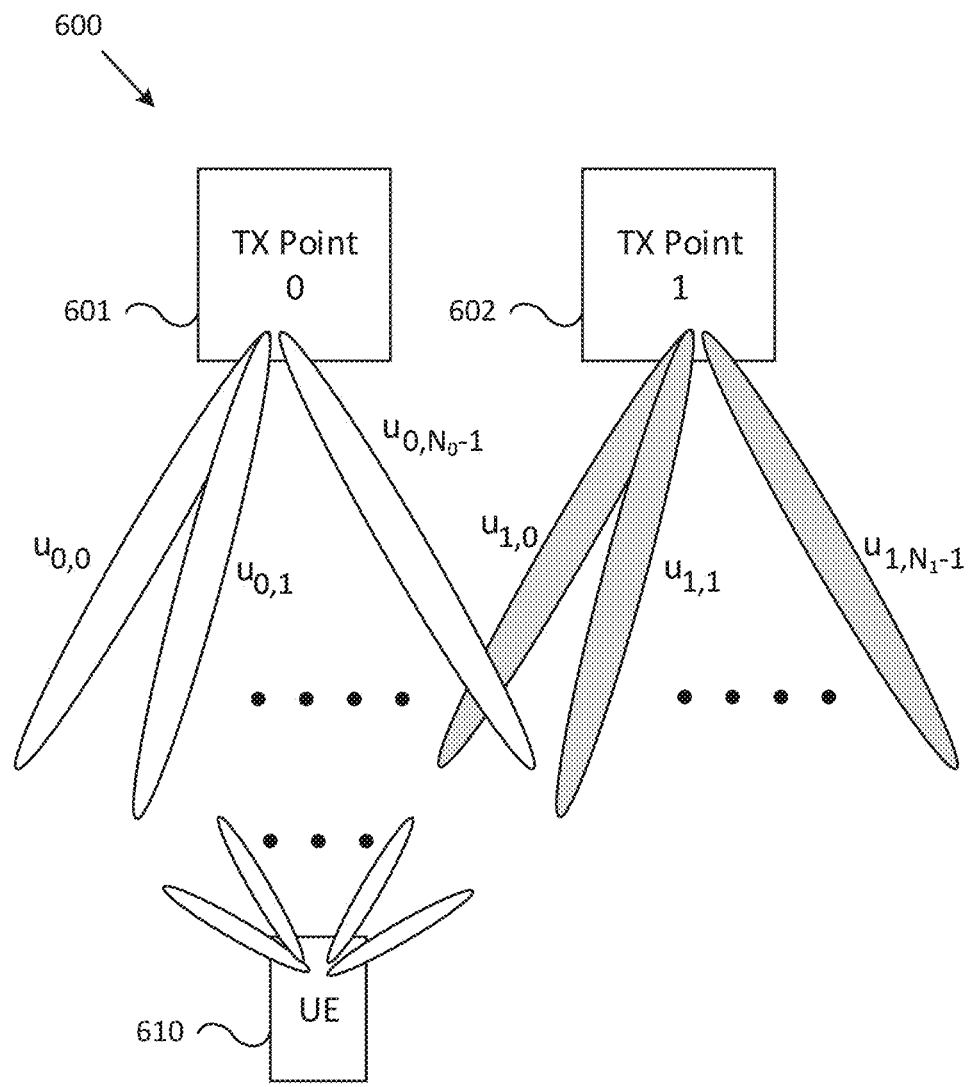
FIG. 6 illustrates an example measurement and reporting scheme for two transmit-receive-points (TRPs) according to one or more embodiments of the present disclosure.

In one example illustrated in FIG. 5, a DL multi-beam operation 500 starts with the gNB/NW signaling to a UE an aperiodic CSI-RS (AP-CSI-RS) trigger or indication (step 501). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 502), the UE measures the AP-CSI-RS and, in turn, calculates and reports a "beam metric" (indicating quality of a particular TX beam hypothesis) (step 503). Examples of such beam reporting (supported in Rel.15 NR) are CSI-RS resource indicator (CRI) or SSB resource indicator (SSB-RI) coupled with its associated L1-RSRP. Upon receiving the beam report from the UE, the NW/gNB can use the beam report to select a DL TX beam for the UE and indicate the DL TX beam selection (step 504) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE (Medium Access Channel Control Element) for the DCI-based selection). Upon successfully decoding the DL-related DCI with the TCI field, the UE performs DL reception (such as data transmission on PDSCH) with the DL TX beam associated with the TCI field (step 505). In this example embodiment, only one DL TX beam is indicated to the UE.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

The present disclosure includes the following components which can be used in conjunction or in combination with one another, or can operate as standalone schemes. A first component includes example embodiments for beam reporting metric. A second component includes example embodiments for signal/channel and/or interference measurements. A third component includes example embodiments for reporting mechanism.

Each of these components can be used either alone (without the other component) or in conjunction with at least one of the other components. Likewise, each of these components includes a plurality of sub-components. Each of the sub-components can be used either alone (without any other sub-component) or in conjunction with at least one of the other sub-components.

For illustrative purposes, the number of active receive diversity chains (antenna ports) at the UE as M. In some implementation (especially for FR1), this can represent the number of receive antennas. In some implementation (especially for FR2), this represents the number of UE panels where each panel is an array of antenna elements driven by analog beamformer and hence able to generate a large number of possible directions. Yet, only one analog beam per panel (which can be single- or dual-polarized) can be used for UL transmission and DL reception at a given time unit or sub-time unit (one or a fraction of a symbol, one or a fraction of a slot). Therefore, one panel, when transmitting or receiving with one analog beam, can accommodate up to one stream/layer if the beam utilizes single polarization, or up to two streams/layers if the beam utilizes dual polarization.

In some of the following embodiments, a SINR metric is calculated. This calculation is facilitated by at least one measurement RS. The measurement RSs can be NZP CSI-RS, SSB, and/or DMRS. For interference (plus noise) measurement, ZP (zero-power) CSI-RS can also be used. This calculation can utilize measurement RS for either channel measurement (CMR) only, or both channel and interference measurement (CMR and IMR). The number of ports associated with the measurement RS can be kept small, e.g. 1 or 2, for a low complexity calculation.

For the first component (that is, beam reporting metric), in some of the following embodiments, beam reporting metric is calculated and defined for different TX-RX beam pairs. For a given TX-RX beam pair, a SINR metric can be calculated across the measurement bandwidth and/or time unit and/or receive diversity branches. For example, the SINR metric can be defined as the linear average of the SINR over the REs carrying measurement RSs within a configured frequency bandwidth. When M is larger than 1, the summation or maximum of SINR across the M receive diversity branches can be used, Or, optionally, the SINR metric can be defined as the linear average (or summation) of the signal power contribution over the REs carrying a first set of measurement RSs within a configured frequency bandwidth and over the M receiver branches, divided by the linear average (or summation) of the interference plus noise power contribution over the REs carrying a second set of measurement RSs within a configured frequency bandwidth and over the M receiver branches.

The term SINR is used for illustrative purposes. Other terms that perform the same functions, such as metric calculation that accounts for interference and noise, can also be used.

This calculation is facilitated by at least one measurement RS. The measurement RSs can be NZP CSI-RS, SSB, and/or DMRS. For interference (plus noise) measurement, ZP CSI-RS can also be used. This calculation can utilize measurement RS for either channel measurement (CMR) only, or both channel and interference measurement (CMR and IMR). The number of ports associated with the measurement RS can be kept small, e.g. 1 or 2, for a low complexity calculation.

For illustrative purposes, the TX beams are denoted as $t=0, 1, \ldots, N_T-1$ and the receive beams as $r=0, 1, \ldots, N_R-1$. The SINR and the RSRP (or, in general, any measure of received signal power) for a given TX-RX beam pair (t, r) are denoted as SINR (t, r) and P(t, r), respectively.

In one embodiment (I.1), a beam reporting metric M(t, r) for a given TX-RX beam pair (t, r) can be defined and calculated as follows.

$$M(t, r) = \gamma(t, r) \times \text{SINR}(t, r) \qquad \text{(Equation I.1.1)}$$

$$\gamma(t, r) = \frac{P(t, r)}{\sum_{r=0}^{N_R-1} \sum_{t=0}^{N_T-1} P(t, r)} \qquad \text{(Equation I.1.2)}$$

When M is larger than 1, the contribution across different diversity branches (dual-polarization, multi-panel UE) can be summed together if MRC receiver is used. If selection receive diversity is used, the maximum across receive diversity branches can be used.

In one sub-embodiment (I.1.1), a beam reporting metric for a given TX-RX beam pair (t, r) can be defined and calculated just as equation (I.1.1) where γ(t, r) can be configured to either 1 or that in equation (I.1.2). When γ(t, r) is set to 1, the beam reporting metric is reduced to a regular SINR. Else, the SINR is weighted in proportion to the RSRP summed across all the TX-RX beam pairs.

In one embodiment (I.2), a beam reporting metric M(t, r) for a given TX-RX beam pair (t, r) can be defined and calculated as follows.

$$M(t, r) = \gamma(t, r) \times \text{SINR}(t, r) \qquad \text{(Equation I.2.1)}$$

$$\gamma(t, r) = \frac{P(t, r)}{\max_{(t,r)} P(t, r)} \qquad \text{(Equation I.2.2)}$$

When M is larger than 1, the contribution across different diversity branches (dual-polarization, multi-panel UE) can be summed together if MRC receiver is used. If selection receive diversity is used, the maximum across receive diversity branches can be used.

In one sub-embodiment (I.2.1), a beam reporting metric for a given TX-RX beam pair (t, r) can be defined and calculated just as equation (I.1.1) where γ(t, r) can be configured to either 1 or that in equation (I.1.2). When γ(t, r) is set to 1, the beam reporting metric is reduced to a regular SINR. Else, the SINR is weighted in proportion to the maximum/largest RSRP across all the TX-RX beam pairs.

In one embodiment (I.3), a beam reporting metric M(t, r) for a given TX-RX beam pair (t, r) can be defined and calculated as follows.

$$M(t, r) = \gamma(t, r) \times \text{SINR}(t, r) + (1 - \gamma(t, r)) \times P(t, r) \qquad \text{(Equation I.3.1)}$$

The coefficient γ(t, r) (where 0≤γ(t, r)≤1) is a weighting coefficient. It can be either fixed (predetermined) or configurable (via higher-layer signaling or signaled to the UE via L1/L2 control signaling). In general, it can be defined as a function of (t, r) or fixed/predetermined to a single value common for all possible (t, r) combinations. When M is larger than 1, the contribution across different diversity branches (dual-polarization, multi-panel UE) can be summed together if MRC receiver is used. If selection receive diversity is used, the maximum across receive diversity branches can be used.

In another embodiment (I.4), a beam reporting metric is an SINR metric which can be defined as the linear average (or summation) of the signal power contribution over the REs carrying a first set of measurement RSs within a configured frequency bandwidth and over the M receiver branches, divided by the linear average (or summation) of the interference plus noise power contribution over the REs carrying a second set of measurement RSs within a configured frequency bandwidth and over the M receiver branches.

$$\text{SINR} = \frac{\sum_{m=1}^{M} \sum_{n=0}^{N_{RE,S}-1} \text{Signal}(n, m)}{\sum_{m=1}^{M} \sum_{n=0}^{N_{RE,IN}-1} \text{IntNoise}(n, m)} \quad \text{(Equation I.4.1)}$$

In this case, the set of REs and hence the measurement RSs (the first and the second) used for measuring signal and interference (plus noise) can differ but correspond to the same frequency bandwidth. For example, the first measurement RS can be an NZP CSI-RS, while the second measurement RS can be a ZP CSI-RS (IMR). In this case, the set of REs occupied by the two measurement RSs can differ (not only in RE location, but also in the number of REs, i.e. $N_{RE,S}$ and $N_{RE,IN}$). Optionally, the first and the second measurement RSs can be identical as well. In another option, the SINR calculation is restricted only to the set of REs that is common (intersection) between the set of REs for the first set of measurement RSs, and the set of REs for the second set of measurement RSs.

In another embodiment (I.5), an SINR metric can be defined either as (a) CSI-SINR in TS 38.215 [REF10], (b) SINR defined in any of the above embodiments.

In one option, the set of REs and hence the measurement RSs used for measuring signal and interference (plus noise) coincide (are the same). For instance, for a given RE, the SINR is derived (calculated according to the SINR definition) based on the signal power contribution and the interference-plus-noise power contribution for that particular RE, where the signal and interference-plus-noise power contributions are derived from the measurement signal occupying that particular RE.

In another option, the set of REs and hence the measurement RSs (the first and the second) used for measuring signal and interference (plus noise) can differ but correspond to the same frequency bandwidth. For example, the first measurement RS can be an NZP CSI-RS, while the second measurement RS can be a ZP CSI-RS (IMR). In this case, the set of REs occupied by the two measurement RSs can differ (not only in RE location, but also in the number of REs, i.e. $N_{RE,S}$ and $N_{RE,IN}$).

In yet another option, the SINR calculation is restricted only to the set of REs that is common (intersection) between the set of REs for the first set of measurement RSs, and the set of REs for the second set of measurement RSs.

For the second component (that is, channel and interference measurements), for multi-beam operation, the beam reporting metric can be defined and calculated to capture short-term and/or long-term interference. Since DL beam selection is typically intended for longer-term operation compared to CSI calculation and reporting, yet still L1 procedure (in contrast to L3 procedures such as inter-cell mobility), provision for configuring a UE with different time-domain measurement behaviors is a desirable feature.

In some cases, interference can be assumed steady for a long period of time (for instance, line-of-sight scenarios where interference source is likely to come from a few locations).

In some other cases, interference is bursty, not because of the channel, but because of the link adaptation and scheduling dynamics (inter- or intra-cells). Therefore, interference becomes less predictable statistically and long-term averaging of interference is unlikely to benefit multi-beam operation.

In addition, the types of interference are considered. For inter-cell interference, it is unclear how this varies across TX-RX beam pair hypotheses. It can be included in SINR calculation but may not impact DL TX beam selection. Intra-cell interference is applicable when more than one TX beams are used at the same time unit (slot, subframe, OFDM symbol). This scenario can include multi-TRP or multi-panel transmission with simultaneous transmission across multi-points (STxMP). Since the impact of receiver algorithm on multi-stream (spatial) interference is not factored into TX beam selection (as TX beam selection is longer term than, e.g. MIMO processing), inter-TX-beam interference is to be minimized without any assumption on UE receiver algorithm. This holds regardless whether different TX points transmit to different UEs, or perform joint transmission (C or NC) to the same UE.

Since signal/channel and interference behaviors can be considered similar (in terms of time and frequency properties) for TX beam selection, it seems important to align the time scale of signal/channel and interference measurement.

In one embodiment (II.1), the time scale between signal/channel and interference measurement can be aligned. In one example, the same time scale/unit is used for signal/channel and interference measurement. In another example, the time scale/unit for interference measurement can be an integer (K) multiple of that for signal/channel measurement where K can be fixed/predetermined or configured from a predetermined set of values. In another example, the time scale/unit for signal/channel measurement can be an integer (L) multiple of that for interference measurement where L can be fixed/predetermined or configured from a predetermined set of values.

As previously mentioned, interference can be measured with the same or different RS resource from signal/channel. Using the same RS resource for signal/channel and interference measurement is more practical if only inter-cell interference is present. However, when intra-cell interference (which comes from other TX sources and tends to be directive) is present, using the same RS resource for signal/channel and interference measurement will result in high UE complexity. In this case, it is more practical to assign different RS resource for interference measurement (analogous to the IMR). While this allows interference measurement to be performed with reasonable complexity, it can result in excessive usage of additional RS resources.

Therefore, efficient schemes for IMR management can be beneficial.

In one embodiment (II.2), one IMR, configured for the purpose of DL beam indication (including DL beam measurement and beam reporting), comprises one CSI-RS resource set which includes a plurality of NZP and/or ZP CSI-RS and/or SSB resources. That is, when a UE is configured with the IMR, one IMR corresponds to multiple resources wherein each resource can be associated with one interference measurement hypothesis or interfering beam (for instance, from another TX point). Each of the multiple resources can occupy a single time unit (such as one slot, subframe, or OFDM symbol), or one sub-time-unit (a fraction of the basic time unit). Essentially, when the IMR is measured by the UE, the UE can assume that each of the multiple resources represents a different TX beam and hence can be received with different spatial filter (i.e. receive beam). This operation can be termed the beam sweeping at the transmitter side. In this case, beam sweeping can be performed across different interfering beam hypotheses, for a given DL TX beam hypothesis.

When the UE is configured as such, embodiment II.1 can be used in conjunction with embodiment II.2. If the number of resources configured for the IMR is $N_{INT}$, the measurement time scale or period for signal/channel measurement (associated with a DL TX beam hypothesis) can be configured or set as $N_{INT}$ times the measurement time scale or period for interference measurement. In this case, the DL TX beam hypotheses (associated with a CMR) is assumed fixed while the UE measures NINT interference hypotheses associated with the IMR resource set.

For the third component (that is, reporting mechanism), an example scenario where inter-beam interference is pertinent is given in diagram 600. Two TX points (TRPs) 0 (601) and 1 (602) are used for illustrative purposes. Extension to more than two TRPs is straightforward to those familiar with the art.

For the UE 610, TX point (TRP) 0 is the signal source. Therefore, signal/channel measurement is performed in relation to TX point 0. TX point (TRP) 1 is the source of interference. For each of the TX points 0 and 1, the UE can be configured to measure $N_0$ and $N_1$ TX beams, respectively. For TRP 0 and 1, the configured TX beams are denoted as $\{u_{0,0}, u_{0,1}, \ldots, u_{0,N_0-1}\}$ and $\{u_{1,0}, u_{1,1}, \ldots, u_{1,N_1-1}\}$, respectively. This configuration can be signaled either via higher-layer (e.g. RRC), MAC CE, L1 control, or any combination thereof.

For DL transmission, each of the TRPs can only transmit on one TX beam for a given time or sub-time unit. Therefore, within one time or sub-time unit, up to two TX beams can be present—one signal/channel source, the other interfering source. In this case, since there are $N_0$ TX beams hypotheses and $N_1$ interfering beams hypotheses, there are a total of $N_0 N_1$ combinations/hypotheses per RX beam hypothesis for the UE to consider—if full/exhaustive search is performed. Full/exhaustive search can result in excessive feedback overhead since this often implies that $N_0 N_1$ beam reporting metrics need to be reported.

Therefore, schemes that facilitate reduction in the number of candidates (without causing significant penalty in performance) are needed.

In this component 3, the term "beam metric" refers to the form and/or function including the examples described in Component 1.

In one embodiment (III.1), the beam metric for a given (selected) TX beam, assuming that the UE observes interference from all the candidate interfering beams is calculated and/or reported. That is, the beam metric for the given (selected) TX beam candidate $u_{0,t}$ ($t \in \{0,1,\ldots,N_0-1\}$) can be described as follows:

$$M(u_{0,t}) = \langle M(u_{0,t}|u_{1,x}) \rangle_{x \in \{0,\ldots,N_1-1\}} \qquad \text{(Equation III.1)}$$

The operator $\langle . \rangle$ can be implemented, for instance, as an ensemble average or some type of mean of $\{M(u_{0,t}|u_{1,x}),\ x=0,1,\ldots,N_1-1\}$. Note that this embodiment is especially relevant when the interference is considered isotropic across different TX beam candidates.

In one embodiment (III.2) (especially relevant when the interference is not isotropic across different TX beam candidates), the beam metrics for a given (selected) TX beam, assuming each of the possible interfering beam hypotheses, are calculated and/or reported. That is, the $N_1$ beam metrics for the given (selected) TX beam candidate $u_{0,t}$ ($t \in \{0,1,\ldots,N_0-1\}$) can be described as follows:

$$\{M(u_{0,t}|u_{1,x})\}_{x \in \{0,\ldots,N_1-1\}} \qquad \text{(Equation III.2)}$$

To calculate these metrics, the UE can measure interference for each combination of the TX beam and interfering beam(s). Furthermore, for each RX beam hypothesis, the UE can calculate the beam metric for each combination of TX beam and interfering beam(s). For this to be implemented, some coordination across different TRPs can be beneficial, if not necessary.

The above description on this embodiment assumes an example scenario with two TPs/TRPs/panels. Extension to more than two TRPs is straightforward to those familiar with the art.

As previously discussed, reporting the beam metrics for all the candidate interfering beams can be excessive in terms of feedback overhead. This is especially prevalent for embodiment III.2. In general, the following parameters (CSI parameters) are included in the beam reporting. 1) Required: Resource Indicator/REI (such as CRI/SSB-RI) of the recommended DL TX beam; 2) Required: beam metric(s) of the recommended DL TX beam associated with DL interfering beam hypotheses; 3) Interference information, e.g. REI(s) (such as CRI(s)/SSB-RI(s)) associated with DL interfering beam hypotheses. As mentioned before, some coordination of resource setting among different TRPs/panels can be beneficial, if not needed. Here, Resource Set can be used to group CSI-RS/SSB resources associated with one TRP/panel.

In the following embodiments, some variations of the beam reporting mechanism are described.

In one embodiment (III.3), termed the "full/exhaustive" scheme, $N_1$ REI(s) associated with $N_1$ interfering beams are calculated and/or reported. This uses searching over $N_0 N_1$ TX beam hypotheses, and reporting $N_1$ beam metrics.

In one embodiment (III.4), termed the "restricted/reduced" scheme, only a subset of the REI(s) and beam metric(s) in embodiment III.3 is calculated/reported. This is plausible since signal and interference beam directions (AoD/AoA) are long-term statistics that can be estimated by the network/NW (e.g. via long-term reciprocity, beam correspondence) or by the UE itself. Therefore, a subset of TX-interfering beam pairs wherein the candidate TX and candidate interfering beams are more likely to produce higher SINR can be chosen. The NW/gNB can select the subset based on, e.g. UL signal measurement (assuming reciprocity or beam correspondence).

Optionally, the UE can select the subset based on DL signal measurement, e.g. SSB or CSI-RS transmitted aperiodically or with high periodicity that facilitates the measurement of all $N_0 N_1$ hypotheses. This can be perceived as a hybrid approach between full/exhaustive and restricted/reduced schemes.

This results in reduced computational complexity and feedback overhead.

For this embodiment III.4, the following sub-embodiments III.4.1 are example calculation and/or reporting schemes.

In one sub-embodiment (III.4.1.1), termed the interference (I)-restricted, M REI(s) associated with size-M subset of $N_1$ interfering beams are calculated and/or reported. This uses searching over $N_0 M$ TX beam hypotheses, and reporting M beam metrics.

In one sub-embodiment (III.4.1.2), termed the signal/interference (S/I)-restricted, joint REI signaling for TX beam and interfering beam (termed SI-RI) associated with size-J subset of $N_0 N_1$ TX-interfering beam pairs are calculated and/or reported. This uses searching over J TX beam hypotheses, and reporting J beam metrics. Compared to III.4.1.1, this sub-embodiment III.4.1.2 allows different hypotheses associated with more than one TX beam hypotheses.

In one sub-embodiment (III.4.1.3), in addition to the calculation and/or reporting in III.4.1.1 and/or III.4.1.2, one additional beam metric (termed "residual beam metric") associated non-selected TX-interfering beam pairs with the non-selected TX-interfering beam pairs ($N_0(N_1-M)$ pairs for III.4.1.1 or ($N_0N_1-J$) pairs for III.4.1.2] is reported. For example, mean, median, or worst-case beam metric associated with the non-selected beam pairs can be used.

For this embodiment III.4, the following sub-embodiments III.4.2 are example subset selection schemes for the TX-interfering beam pairs. Any of the following sub-embodiments can be used in conjunction with any of the sub-embodiments in III.4.1.

In one sub-embodiment (III.4.2.1), the subset selection can be fixed/predetermined in specification.

In one sub-embodiment (III.4.2.2), the subset selection can be configured either via higher layer signaling (e.g. RRC), MAC CE, L1 control, or any combination thereof, by the NW/gNB (NW/gNB-configured). When L1 control signaling is used, UE-specific or dedicated DCI can be used. Optionally, UE-group DCI can also be used to signal the subset selection to a group of UEs.

In one sub-embodiment (III.4.2.3), the subset selection can be recommended by the UE, determined by the NW/gNB (UE-assisted), e.g. via the described hybrid approach.

In one sub-embodiment (III.4.2.4), the subset selection can be selected/determined by the UE (UE-selected), analogous to sub-embodiment III.4.1.2 from UE reporting perspective, but without the need for NW/gNB selecting/configuring the subset for TX-interfering beam pairs.

For this embodiment III.4, the following sub-embodiments III.4.3 are example beam metric reporting formats. Any of the following sub-embodiments can be used in conjunction with any of the sub-embodiments in III.4.1 and/or III.4.2. When multiple beam metric reporting parameters ($N_{metric}$) are reported, different encoding/reporting strategies are possible.

In one sub-embodiment (III.4.3.1), B bits per beam metric (B is fixed/predetermined or configured via higher-layer signaling) can be used.

In one sub-embodiment (III.4.3.2), one "main beam metric" with $B_0$ bits, accompanied by the remaining beam metric(s) with $B_1$ bits where $B_0>B_1$. The $B_1$-bit SINR can be absolute or differentially derived from the "main beam metric". The TX-interfering beam pair for the "main beam metric" can be indicated separately or jointly with the other resource indicators/REIs (e.g. CRI/SSB-RI).

For this embodiment III.4, the following sub-embodiments III.4.4 are example resource indicator (REI) reporting formats. Any of the following sub-embodiments can be used in conjunction with any of the sub-embodiments in III.4.1 and/or III.4.2 and/or III.4.3. As previously described, REI can be either CRI, SSB-RI, or any other RS resource indicator, or any combination thereof In one sub-embodiment (III.4.4.1), especially prevalent for sub-embodiment III.3 and III.4.1.1, one TX beam REI and/or at least one interfering beam REI can be reported. Optionally, interfering beam REI(s) may not need to be signaled if subset selection is fixed/predetermined or higher-layer configured. Here, only the beam metric(s) and one TX beam REI are reported.

In one sub-embodiment (III.4.4.2), especially prevalent for sub-embodiment III.4.1.2, at least one SI-RI is reported.

Optionally, the SI-RI may not need to be signaled if subset selection is fixed/predetermined or higher-layer configured. Here, only the beam metric(s) are reported since the ordering of beam metric(s) can be based on the ordering in the configured state definition in relation to the subset selection.

Although described herein as various embodiments, any combination of the above options can be used.

The term SINR is used for illustrative purposes. Other terms that perform the same functions, such as metric calculation that accounts for interference and noise, can also be used.

Any of the above variation embodiments can be utilized independently or in combination with at least one other variation embodiment.

Figure 7:
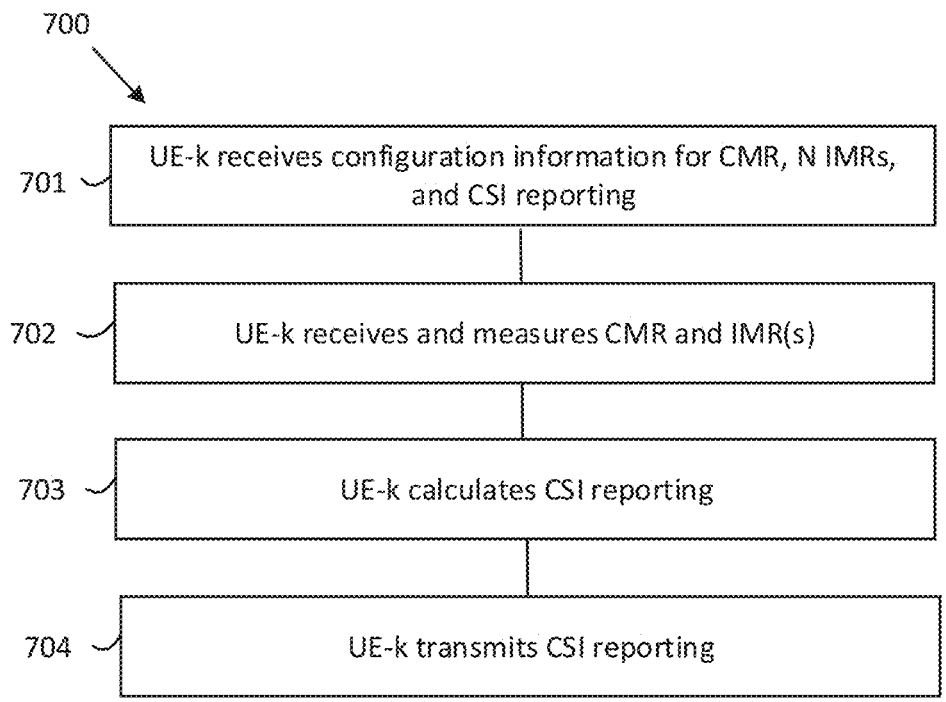
FIG. 7 illustrates a flowchart for an example method wherein a UE receives configuration information on CMR, IMR, and CSI reporting according to one or more embodiments of the present disclosure.

FIG. 7 illustrates a flowchart for an example method 700 wherein a UE receives configuration information on CMR, IMR, and CSI reporting according to an embodiment of the present disclosure. For example, the method 700 can be performed by the UE 116. The embodiment of the method 700 shown in FIG. 7 is for illustration only.

The method 700 begins with the UE receiving, from a base station, configuration information on a CMR, N IMRs, and CSI reporting (step 701). In this case, the configuration information for the CSI reporting indicates a selection for SINR. Having received the configuration information, the UE receives the reference signals associated with the CMR and IMRs, measures them (step 702), calculates (step 703) and transmits the CSI reporting (step 704). Here, the CSI reporting includes M SINRs, each associated with an interference hypothesis, N is greater than or equal to 2, and M is a greater than or equal to 1. The CMR is either SSB or NZP CSI-RS, and the IMRs are NZP CSI-RSs.

When M is equal to 1, the interference hypothesis corresponds to the presence of N interferers associated with the N configured IMRs. Here, the measurement time for the CMR is N times the measurement time for each of the N configured IMRs. The measurement time can be set using time-domain measurement restriction with respect to a reference time (such as the slot in which the CMR/IMR resides, possibly with some offset). For periodic CMR/IMR, the measurement time can also depend on the time offset and periodicity. When M is equal to N, each of the N interference hypotheses corresponds to the presence of one of the N interferers associated with the N configured IMRs. When M is greater than 1 and less than M, there are at least two possible options. In a first option, each of the first (M−1) interference hypotheses corresponds to the presence of one of the N interferers, and the last interference hypothesis corresponds to the presence of the rest (N−M+1) interferers, where the N interferers are associated with the N configured IMRs. In a second option, each of the M interference hypotheses corresponds to the presence of one of the M interferers associated with a size-M subset of the N configured IMRs. In this case, the size-M subset (that is, the subset selection of M out of N) is signaled to the UE either via Medium Access Channel Control Element (MAC CE) or Physical Downlink Control Channel (PDCCH).

Figure 8:
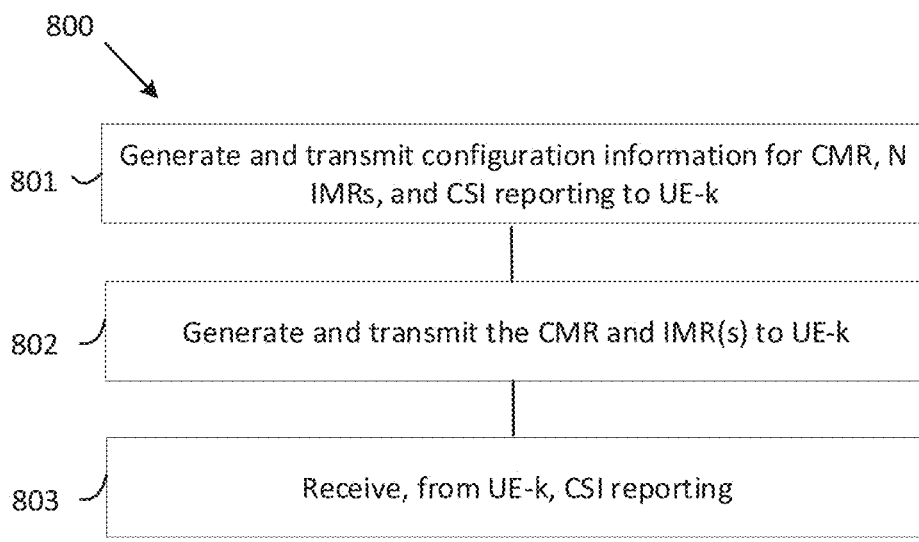
FIG. 8 illustrates a flowchart for an example method wherein a BS generates a configuration information on CMR, IMR, and CSI reporting according to one or more embodiments of the present disclosure.

FIG. 8 illustrates a flowchart for an example method 800 wherein a BS generates configuration information on CMR, IMR, and CSI reporting to a UE (labeled as UE-k) according to an embodiment of the present disclosure. For example, the method 800 can be performed by the BS 102. The embodiment of the method 800 shown in FIG. 8 is for illustration only.

The method 800 begins with the BS generating and transmitting, to UE-k begins with the UE receiving, from a base station, configuration information on a CMR, N IMRs, and CSI reporting (step 801). In this case, the configuration information for the CSI reporting indicates a selection for SINR. Having generated the configuration information, the BS generates and transmits the reference signals associated with the CMR and IMRs (step 802), and receives the CSI reporting (step 803). Here, the CSI reporting includes M SINRs, each associated with an interference hypothesis, N is greater than or equal to 2, and M is a greater than or equal to 1. The CMR is either SSB or non-zero power NZP CSI-RS, and the IMRs are NZP CSI-RSs.

When M is equal to 1, the interference hypothesis corresponds to the presence of N interferers associated with the N configured IMRs. Here, the measurement time for the CMR is N times the measurement time for each of the N configured IMRs. The measurement time can be set using time-domain measurement restriction with respect to a reference time (such as the slot in which the CMR/IMR resides, possibly with some offset). For periodic CMR/IMR, the measurement time can also depend on the time offset and periodicity. When M is equal to N, each of the N interference hypotheses corresponds to the presence of one of the N interferers associated with the N configured IMRs. When M is greater than 1 and less than M, there are at least two possible options. In a first option, each of the first (M−1) interference hypotheses corresponds to the presence of one of the N interferers, and the last interference hypothesis corresponds to the presence of the rest (N−M+1) interferers, where the N interferers are associated with the N configured IMRs. In a second option, each of the M interference hypotheses corresponds to the presence of one of the M interferers associated with a size-M subset of the N configured IMRs. In this case, the size-M subset (that is, the subset selection of M out of N) is signaled to the UE either via Medium Access Channel Control Element (MAC CE) or Physical Downlink Control Channel (PDCCH).

Although FIGS. 7 and 8 illustrate examples of methods for receiving configuration information and configuring a UE, respectively, various changes can be made to FIGS. 7 and 8. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to:
receive, from a base station (BS), configuration information on an aperiodic channel state information (CSI) reporting, configuration information on a non-zero power channel state information reference signal (NZP CSI-RS) resource for channel measurement, configuration information on a zero power channel state information reference signal (ZP CSI-RS) resource for interference measurement, configuration information on a NZP CSI-RS resource for interference measurement, and configuration information on a report for a layer 1 signal-to-interference-plus-noise ratio (L1-SINR) measurement; and
receive, from the base station, at least one reference signals on the NZP CSI-RS resource for channel measurement, the ZP CSI-RS resource for interference measurement, and the NZP CSI-RS resource for interference measurement; and
a processor operably connected to the transceiver, the processor configured to perform the L1-SINR measurement on the at least one reference signal for the aperiodic CSI reporting,
wherein the transceiver is further configured to transmit, to the base station, the aperiodic CSI reporting comprising information on at least one L1-SINR value based on the L1-SINR measurement, and
wherein the at least one L1-SINR value comprises a main SINR value and a differential SINR value.

2. The UE of claim 1, wherein a result of the L1-SINR measurement includes a measurement of a downlink beam.

3. The UE of claim 1, wherein each of the ZP CSI-RS resource for interference measurement and the NZP CSI-RS resource for interference measurement is associated with a respective interference hypothesis.

4. The UE of claim 3, wherein:
each of the respective interference hypotheses corresponds to a presence of one of M interferers, where the M interferers are associated with a size-M subset of resources for interference measurement; and
the size-M subset is signaled to the UE via a medium access control control element (MAC CE) or a physical downlink control channel (PDCCH).

5. The UE of claim 1, wherein the at least one reference signal includes an aperiodic CSI-RS, and
wherein the aperiodic CSI reporting is triggered by a downlink control information (DCI).

6. A base station (BS) comprising:
a transceiver configured to transmit, to a user equipment (UE), configuration information on an aperiodic channel state information (CSI) reporting, configuration information on a non-zero power channel state information reference signal (NZ CSI-RS) resource for channel measurement, configuration information on a zero power channel state information reference signal (ZP CSI-RS) resource for interference measurement, configuration information on a NZP CSI-RS resource for interference measurement, and configuration information on a report for a layer 1 signal-to-interference-plus-noise ratio (L1-SINR) measurement; and
a processor operably coupled to the transceiver, the processor configured to determine at least one reference signal on the NZP CSI-RS resource for channel measurement, the ZP CSI-RS resource for interference measurement, and the NZP CSI-RS resource for interference measurement,
wherein the transceiver is further configured to:
transmit, to the UE, the at least one reference signals; and
receive, from the UE, the aperiodic CSI reporting comprising information on at least one L1-SINR value based on the L1-SINR measurement on the at least one reference signal, and
wherein the at least one L1-SINR value comprises a main SINR value and a differential SINR value.

7. The BS of claim 6, wherein a result of the L1-SINR measurement includes a measurement of a downlink beam.

8. The BS of claim 6, wherein each of the ZP CSI-RS resource for interference measurement and the NZP CSI-RS resource for interference measurement is associated with a respective interference measurement hypothesis.

9. The BS of claim 6, wherein:
the at least one reference signal includes an aperiodic CSI-RS, and
the aperiodic CSI reporting is triggered by a downlink control information (DCI).

10. A method for operating a user equipment (UE), the method comprising:
receiving, from a base station, configuration information on an aperiodic channel state information (CSI) reporting, configuration information on a non-zero power channel state information reference signal (NZP CSI-RS) resource for channel measurement, configuration information on a zero-power channel state information reference signal (ZP CSI-RS) resource for interference measurement, configuration information on a NZP CSI-RS resource for interference measurement, and configuration information on a report for a layer 1 signal-to-interference-plus-noise ratio (L1-SINR) measurement;
receiving, from the base station, at least one reference signal on the NZP CSI-RS resource for channel measurement, the ZP CSI-RS resource for interference measurement, and the NZP CSI-RS resource for interference measurement;
performing the L1-SINR measurement on the at least one reference signal for the aperiodic CSI reporting; and
transmitting, to the base station, the aperiodic CSI reporting comprising information on at least one L1-SINR value based on the L1-SINR measurement,
wherein the at least one L1-SINR value comprises a main SINR value and a differential SINR value.

11. The method of claim 10, wherein each of the ZP CSI-RS resource for interference measurement and the NZP CSI-RS resource for interference measurement is associated with a respective interference measurement hypothesis.

12. The method of claim 11, wherein:
the at least one reference signal includes an aperiodic channel state information reference signal (CSI-RS),
wherein the aperiodic CSI reporting is triggered by a downlink control information (DCI).

13. The method of claim 10, wherein a result of the L1-SINR measurement includes a measurement of a downlink beam.

* * * * *